(12) United States Patent
Gazeau et al.

(10) Patent No.: US 12,525,237 B2
(45) Date of Patent: Jan. 13, 2026

(54) PROCEDURAL KNOWLEDGE FOR A SMART HOME AUTOMATION SYSTEM

(71) Applicant: LG ELECTRONICS INC., Seoul (KR)

(72) Inventors: Maxime Gazeau, East York (CA); Harmanpreet Singh, Surrey (CA); Royal Denzil Sequiera, Toronto (CA); Kevin Ferreira, Toronto (CA)

(73) Assignee: LG ELECTRONICS INC., Seoul (KR)

( * ) Notice: Subject to any disclaimer, the term of this patent is extended or adjusted under 35 U.S.C. 154(b) by 292 days.

(21) Appl. No.: 18/165,883

(22) Filed: Feb. 7, 2023

(65) Prior Publication Data

US 2023/0252990 A1    Aug. 10, 2023

Related U.S. Application Data

(60) Provisional application No. 63/307,555, filed on Feb. 7, 2022.

(51) Int. Cl.
*G10L 15/22*    (2006.01)
*G10L 15/16*    (2006.01)
(Continued)

(52) U.S. Cl.
CPC .............. *G10L 15/22* (2013.01); *G10L 15/16* (2013.01); *G10L 15/30* (2013.01);
(Continued)

(58) Field of Classification Search
CPC ................................ G10L 15/22; G10L 17/22
See application file for complete search history.

(56) References Cited

U.S. PATENT DOCUMENTS

| 6,567,778 B1 * | 5/2003 | Chao Chang ......... G06F 40/295 |
|---|---|---|
|  |  | 704/275 |
| 2016/0259308 A1 | 9/2016 | Fadell et al. |

(Continued)

OTHER PUBLICATIONS

Coucke et al., "Snips Voice Platform: an embedded Spoken Language Understanding system for private-by-design voice interfaces," Dec. 2018, http://arxiv.org/abs/1805.10190.

(Continued)

*Primary Examiner* — Feng-Tzer Tzeng
(74) *Attorney, Agent, or Firm* — LEE, HONG, DEGERMAN, KANG & WAIMEY

(57) ABSTRACT

According to at least one embodiment, an artificial intelligence apparatus includes at least one audio sensor configured to capture audio data in an environment, and at least one processor. The at least one processor is configured to: detect an utterance in the audio data; determine an inability to comprehend the utterance based on information being missing in the utterance; and acquire the missing information. The at least processor is further configured to acquire the missing information by at least: acquiring the missing information from at least one smart device of a plurality of smart devices located in the environment; or acquiring the missing information from a knowledge base of the artificial intelligence apparatus. The at least one processor is further configured to complete comprehension of the utterance based on the acquired missing information.

16 Claims, 9 Drawing Sheets

(51) Int. Cl.
  *G10L 15/30* (2013.01)
  *H04L 12/28* (2006.01)
  *G10L 17/22* (2013.01)

(52) U.S. Cl.
  CPC .... *H04L 12/2803* (2013.01); *G10L 2015/223* (2013.01); *G10L 2015/228* (2013.01); *G10L 17/22* (2013.01)

(56) References Cited

U.S. PATENT DOCUMENTS

2018/0210703 A1* 7/2018 Meyers ............... G10L 15/00
2019/0019518 A1* 1/2019 Kojima ............... G10L 15/08

OTHER PUBLICATIONS

Ping et al., "Interactive Teaching for Conversational AI," NeurIPS, Dec. 2020, http://arxiv.org/abs/2012.00958.

* cited by examiner

PROCEDURAL KNOWLEDGE FOR A SMART HOME AUTOMATION SYSTEM

CROSS-REFERENCE TO RELATED APPLICATION(S)

Pursuant to 35 U.S.C. § 119(e), this application claims the benefit of U.S. Provisional Patent Application No. 63/307,555, filed on Feb. 7, 2022, the contents of which are all hereby incorporated by reference herein in their entirety.

BACKGROUND

A smart device is an electronic device that can be connected to another electronic device(s) and/or a network(s) via one or more wireless protocols (e.g., Bluetooth™, Zigbee™ near-field communication, Wi-Fi™, Li-Fi™, 5G, etc.). Smart devices are able to communicate and share information via such communication protocols. Such devices can operate, at least to some extent, interactively and autonomously.

When provided in a home, smart devices may become part of a smart home environment. One or more users (e.g., occupants of the home) may interact with any of various smart devices including, for example, thermostats, lighting systems, refrigerators, entertainment system devices, etc. In such an environment, a home automation system may monitor such smart devices, and may be used to interact with such smart devices. Such a system may be controllable via a virtual/conversational assistant (e.g., Google Home™, Amazon Alexa™ Siri™, etc.).

A user may interact with such a virtual assistant by speaking an utterance (e.g., command, request or query). The utterance may match (or correspond to) a recognized utterance that is in a set of pre-designated utterances that are associated with a particular smart device. For example, with respect to a smart refrigerator that a user seeks to control, the utterance may match an utterance that had been previously implemented by the manufacturer of the refrigerator. Due to the matching, the home automation system is able to comprehend the utterance spoken by the user. For example, the home automation system may be able to recognize the utterance spoken by the user as a particular command that is associated with the refrigerator. Accordingly, the home automation system is able to cause the command to be carried out, e.g., by interacting with the refrigerator via a wireless protocol.

However, in some situations, a home automation system may be unable to comprehend an utterance spoken by the user. This may occur, for example, when an utterance spoken by a user does not match (or correspond to) any recognized utterance in a set of pre-designated utterances that are associated with a particular smart device. Because the home automation system is unable to comprehend the utterance spoken by the user, the home automation system may be unable to respond to the user in a satisfactory manner. For example, because the home automation system is unable to discern an intent of the user, the home automation system may be unable to cause an intended command to be carried out. Rather, the home automation system may cause the virtual assistant to respond to the user by stating "I do not know" or "I do not understand." From the perspective of the user, such a response may be deemed unsatisfactory.

SUMMARY

One or more aspects of this disclosure are directed towards providing a home automation system that is better able to comprehend utterances spoken by a user. This, in turn, improves and/or enhances the ability of the user to control (or interact with) smart devices in a smart home environment.

The improvement in comprehension may be achieved by filling deficiencies in the knowledge of a home automation system by, for example, collecting information from within a corresponding smart home environment. For example, the home automation system may communicate with one or more smart devices located within the smart home environment to gather missing information and/or contextual information. Such information may be collected from the smart devices, e.g., to dynamically develop a knowledge base of the home automation system. The dynamic development of the knowledge base enables the home automation system to generalize its knowledge in order to better handle different situations as they arise. For example, the generalization enables the home automation system to better address newly encountered situations (e.g., queries) as they arise. In contrast, attempting to anticipate, in advance, every possible task and/or situation may prove difficult and also less worthwhile.

Aspects of this disclosure are directed to providing a simulated environment in which a large number of scenarios may be generated. Each scenario may involve a number of smart devices, each having different characteristics that may be involved in a user interaction. Such a simulated environment simulates an orchestration of the smart devices. Each scenario may also correspond to a different home layout.

During a user interaction, a user may provide a command that is specified incorrectly or that is invalid. According to at least one embodiment, a home automation system interacts with the simulated environment, to learn a process (or policy) of gathering missing information in order to correctly interpret the command and control execution of the commanded task. Such learning renders the home automation system better able to understand queries that do not map to any pre-programmed task, and enables the home automation system to generalize its knowledge across different smart devices in the smart home environment. According to at least one embodiment, the user is prompted to provide additional information (e.g., clarifying information) when attempts by the home automation system to gather the information (e.g., from within the simulated environment) prove unsuccessful.

One or more aspects are directed to providing a more holistic smart home environment in which smart devices, user preferences, and/or one or more knowledge bases can be orchestrated by a home automation system.

According to at least one embodiment, an artificial intelligence apparatus includes at least one audio sensor configured to capture audio data in an environment, and at least one processor. The at least one processor is configured to: detect an utterance in the audio data; determine an inability to comprehend the utterance based on information being missing in the utterance; and acquire the missing information. The at least processor is further configured to acquire the missing information by at least: acquiring the missing information from at least one smart device of a plurality of smart devices located in the environment; or acquiring the missing information from a knowledge base of the artificial intelligence apparatus. The at least one processor is further configured to complete comprehension of the utterance based on the acquired missing information.

According to at least one embodiment, a method of operating an artificial intelligence apparatus comprises: detecting, by at least one processor, an utterance in audio data captured in an environment by at least one audio sensor; determining, by the at least one processor, an inability to comprehend the utterance based on information being missing in the utterance; and acquiring, by the at least one processor, the missing information by at least: acquiring the missing information from at least one smart device of a plurality of smart devices located in the environment; or acquiring the missing information from a knowledge base of the artificial intelligence system. The method further comprises completing, by the at least one processor, comprehension of the utterance based on the acquired missing information.

According to at least one embodiment, a non-transitory computer-readable medium stores instructions that, when executed by one or more processors, cause the one or more processors to: detect an utterance in audio data captured in an environment by at least one audio sensor; determine an inability to comprehend the utterance based on information being missing in the utterance; and acquire the missing information by at least: acquiring the missing information from at least one smart device of a plurality of smart devices located in the environment; or acquiring the missing information from a knowledge base of the artificial intelligence system. The instructions further cause the one or more processors to: complete comprehension of the utterance based on the acquired missing information.

DETAILED DESCRIPTION

Figures 1A, 1B:
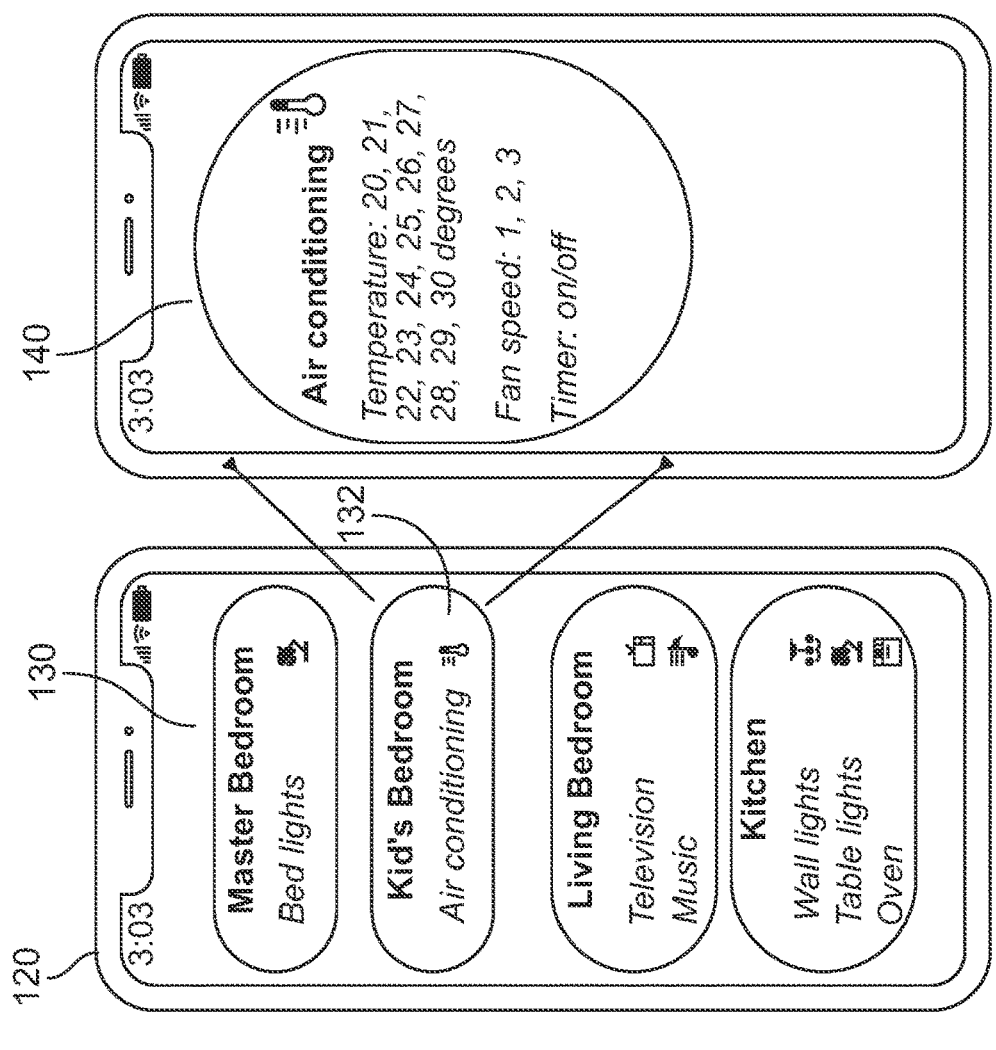
FIG. 1A is a diagram of an example environment (e.g., home environment).
FIG. 1B illustrate example display interfaces that are provided by a home automation application according to at least one embodiment.

Aspects of this disclosure are directed to providing an artificial intelligence (AI) system capable of learning a procedure via composition of skills (orchestration). A procedure is a sequence of actions (or skills) performed to reach a goal. To complete the goal via orchestration, the AI system may execute actions ranging from low-level actions to high-level actions such as a simpler procedure or pre-trained AI systems. For example, to complete a given objective, the overarching system may coordinate between low-level actions that make a procedure, or existing AI components. Such an action space has a hierarchical structure.

One or more systems previously disclosed can operate only in constrained scenarios where the procedures are well defined and the set of skills is complete. A set of skills is considered to be complete if the skills are not overlapping and are sufficient for performing a particular task.

Regarding such previously disclosed systems, a user may provide a query to such a system. The query may lack contextual information, and, therefore, it may be difficult for the system to comprehend the query and to execute a satisfactory response. For example, according to an underlying procedure, the system executes an underlying task if the system is able to understand the query. If the system is unable to understand the query, then the system prompts the user to provide clarifying information. Such a default response increases a level of user friction, which relates to a range of situations in which a user is effectively prevented from accomplishing an intended goal.

One or more aspects of this disclosure are directed toward reducing (e.g., minimizing) user friction. According to at least one embodiment, a home automation system develops a set of skills to improve understanding of various tasks that a user may request. To improve such understanding, the system may perform navigation to learn about areas of an environment (e.g., rooms in a smart home environment) and about smart devices in the environment, to query a smart device to learn about its possible attributes, and/or retrieve information from a knowledge base of the system. The amount of information that is learned and/or retrieved may depend on the complexity of a request, as well as the amount of information provided by the user in the request. According to at least one embodiment, the system ultimately prompts the user to provide clarifying information if attempts to gather the information without engaging the user prove unsuccessful. As such, a level of user friction may be reduced.

One or more aspects of this disclosure are directed to providing a framework in which different simulated smart home environments can be created, each environment having different layouts, devices and/or objectives. A variety of scenarios can be simulated. For each scenario, a specific procedure can be learned. Learning such procedures enables a home automation system to be more robust with respect to one or more situations that it has not previously encountered.

FIG. 1A is a diagram of an example environment 100 (e.g., home environment).

The example environment 100 includes multiple rooms. The rooms include a master bedroom 102, a children's bedroom 104, a living room 106 and a kitchen 108. One or more smart devices are located (e.g., positioned) in each of the rooms. For example, bed lights are located in the master bedroom 102, and an air conditioning device is located in the children's bedroom 104. As further examples, a television and a music playing device are located in the living room 106, and wall lights, table lights and an oven are located in the kitchen 108.

FIG. 1B illustrates example display interfaces 130, 140 that are provided by a home automation application according to at least one embodiment. The display interface 130 may be displayed at a device 120 (e.g., mobile telephone, electronic tablet, etc.), and may display different icons respectively corresponding to the smart devices located in the rooms 102, 104, 106, 108. For example, the display interface 130 displays icon 132 corresponding to the air conditioning device that is located in the children's bedroom

104. Selection of the icon 132 may cause the device 120 to display the display interface 140.

For each of the smart devices located in the rooms 102, 104, 106, 108, one or more settings (e.g., attributes or options) may be controlled. For example, a user may control a smart device such that a given setting of the smart device may be set to a desired value. The user may control the smart device in such a manner via the home automation application.

As illustrated in FIG. 1B, the display interface 140 displays settings (or attributes) of the air conditioning device that is located in the children's bedroom 104. The settings may include: a temperature; a speed of a fan; and an on/off state of a timer function. The display interface 140 further displays possible values of each of the settings. For example, regarding the speed of the fan, possible values may include '1,' '2,' or '3.' Via the home automation application, the user may control the air conditioning device such that the speed of the fan is set to '1,' '2,' or '3.'

Figure 2:
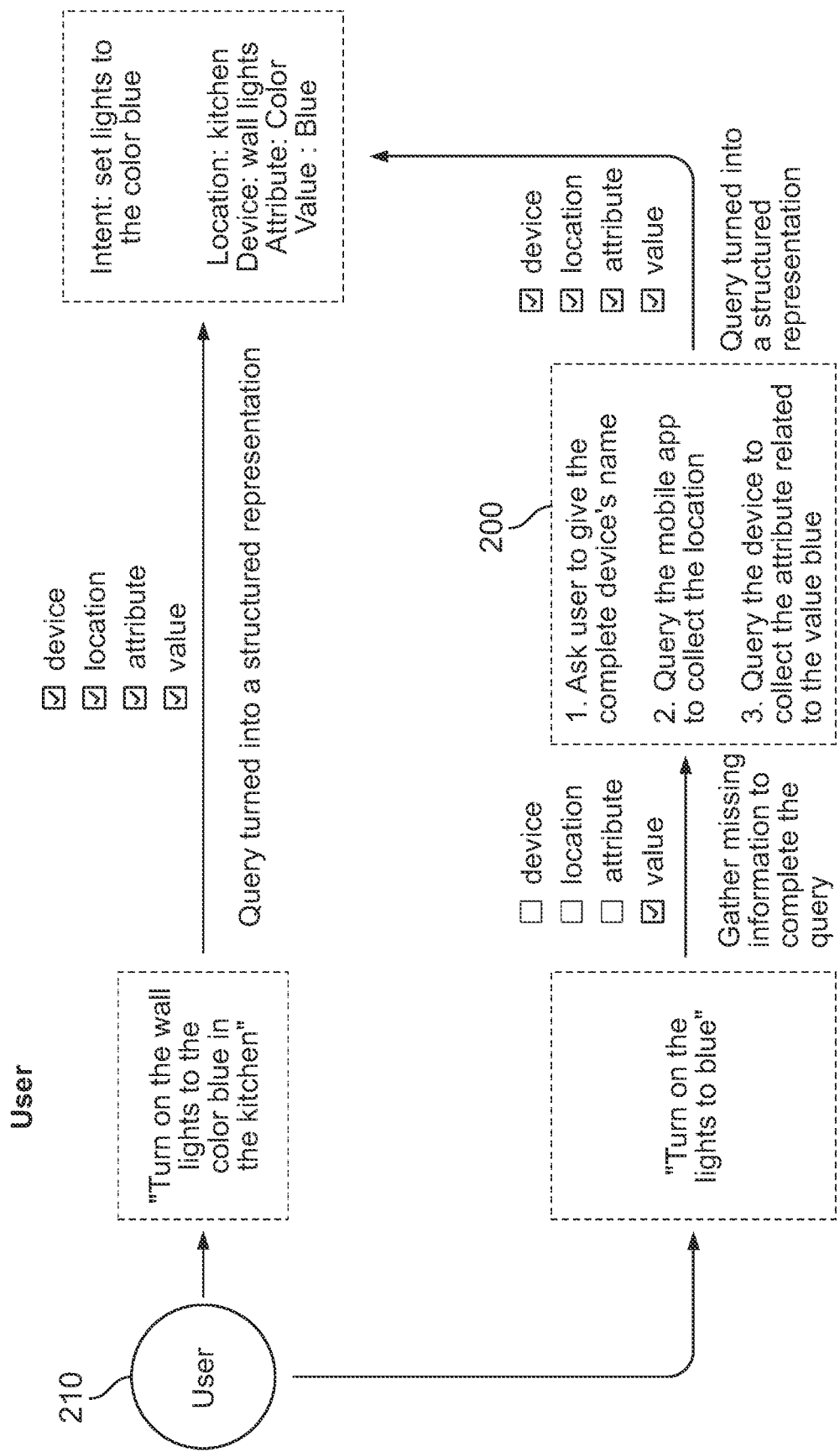
FIG. 2 illustrates example responses to utterances (e.g., commands) spoken by a user, as provided by a home automation application according to at least one embodiment.

FIG. 2 illustrates example responses to utterances (e.g., commands) spoken by a user 210, as provided by a home automation application (or system or apparatus) 200 according to at least one embodiment. The responses may be based on speech-to-text conversion of utterances that are captured by an audio sensor (e.g., microphone).

An utterance may match (or correspond to) an utterance that is in a set of pre-designated utterances that are associated with a smart device that is to be controlled. Alternatively (or in addition), the utterance may contain a sufficient set of details/information that enables the home automation system to comprehend the utterance spoken by the user 210. In either situation, the home automation system is able to respond to the user 210 in a satisfactory manner. For example, the home automation system is able to cause an intended command to be carried out.

For example, with reference to FIG. 2, the user 210 may speak the following utterance: "Turn on the wall lights to the color blue in the kitchen."

This utterance may match (or correspond to) an utterance that is in a set of pre-designated utterances that are associated with the device that is to be controlled (i.e., the wall lights in the kitchen 108).

Alternatively (or in addition), the utterance may contain a sufficient set of details/information that enables the home automation system to comprehend the request spoken by the user 210. For example, in at least some situations, the home automation system is able to comprehend a request if the home automation system understands the request as containing details addressing each of the following four parameters: device; location; attribute; and value.

For example, the utterance "Turn on the wall lights to the color blue in the kitchen" may contain details addressing each of the following four parameters: a device (to be controlled); a location (of the device); an attribute (of the device); and a value (of the attribute).

For example, the phrase "wall lights" can be understood as addressing (or pertaining to) a specific device (e.g., a specific device in the environment 100). The term "kitchen" can be understood as addressing the location of the wall lights. The term "color" can be understood as addressing an attribute of the wall lights that is controllable. Finally, the term "blue" can be understood as addressing a possible value of the attribute of the wall lights.

The term "blue" can be understood as such due to a recognition (e.g., an earlier achieved recognition) of this term as being a possible value of the attribute of the wall lights. Such a recognition may have taken place while the home automation system ran through different game-type scenarios, in which a procedure in which a lamp or lighting device in a particular room (e.g., room 102, 104, 106, 108) was controlled to output light of a certain color. Once the home automation system (or an engine or agent thereof) has learned to execute such a procedure, the home automation system may be able to generate various games, including a large number of configurations in which the home automation system is provided an opportunity to run through a game-type scenario in which a lamp or lighting device at a certain location is controlled to output light of various colors (e.g., blue). By running through such configurations, the home automation system may learn to recognize specific terms as corresponding to possible values of attributes of specific devices.

Accordingly, the home automation system understands the utterance "Turn on the wall lights to the color blue in the kitchen" as containing details addressing each of the following four parameters: device; location; attribute; and value. This understanding enables the home automation system to produce a structured representation of the utterance. Therefore, the home automation system is able to cause the request to be carried out, and cause the wall lights in the kitchen 108 (see, e.g., FIG. 1) to be set to blue.

In contrast, an utterance may not match (or correspond to) an utterance that is in a set of pre-designated utterances that are associated with a device that is to be controlled. Alternatively (or in addition), the user 210 may speak an utterance that does not contain a sufficient set of details/information that enables the home automation system to comprehend the utterance. In either situation, the home automation system is unable to respond to the user 210 in a satisfactory manner. For example, the home automation system is unable to cause an intended command to be carried out.

According to at least one embodiment, in a situation where the intention of an utterance is unclear, a home automation system may communicate with one or more smart devices located within the smart home environment to gather missing information and/or contextual information. Alternatively (or in addition), the home automation system may collect such information from a knowledge base that it has developed. If such approaches prove unsuccessful, the home automation system may prompt the user 210 to provide additional information. For example, the home automation system may ask the user 210 a question in order to map the unclear utterance into one of the pre-defined utterances.

For example, with continued reference to FIG. 2, the user 210 may speak the following utterance: "Turn on the lights to blue."

This utterance may not match (or correspond to) an utterance that is in a set of pre-designated utterances that are associated with a device that is to be controlled. Also, the utterance may not contain a sufficient set of details/information that enables the home automation system to comprehend the utterance spoken by the user 210.

For example, as explained earlier regarding the utterance "Turn on the wall lights to the color blue in the kitchen," the term "blue" can be understood as addressing a possible value of a color attribute. However, with respect to the utterance "Turn on the lights to blue," the term "lights," without further description, cannot be understood as addressing a particular device.

By way of example, with reference back to FIG. 1, it may be understood by the home automation system that the bed lights are located in the master bedroom 102, and that the Wall lights and Table lights are located in the kitchen 108. However, based merely on the term "lights," the home automation system is unable to comprehend which of such devices the user 210 is addressing.

Accordingly, according to at least one embodiment, the home automation system attempts to gather information in order to fully comprehend the utterance.

For example, the home automation system may ask the user 210 to provide a more complete name of the device and/or the location of the device that is to be controlled.

In response to the above, the user 210 may utter "Wall lights" or "Wall lights in the kitchen."

Either of such utterances would enable the home automation system to comprehend which device the user 210 is addressing. As described earlier, the home automation system understands that the Wall lights are located in the kitchen 108.

According to at least one embodiment, prior to prompting the user 210 to provide additional clarifying information (e.g., information regarding location and/or attribute), the home automation system first attempts to gather information in order to fully comprehend the utterance. As such, user friction is reduced.

For example, regarding location, the location of the Wall lights (i.e., kitchen 108) can be retrieved by the home automation system from its knowledge base. The home automation system understands that the Wall lights are located in the kitchen 108. (See, e.g., the display interface 130 of FIG. 1B.) Therefore, the home automation system need not prompt the user 210 to provide additional clarifying information regarding location of the Wall lights.

As another example, regarding attribute, the home automation system may communicate with one or more smart devices to discern the attribute that is to be controlled. For example, the home automation system may query the Wall lights located in the kitchen 108, to determine what attribute(s) can be set to have a value of blue. In response, the Wall lights may communicate to the home automation system that a color attribute may be set to the value blue. Because information regarding the attribute that is to be controlled can be collected from the Wall lights, the home automation system need not prompt the user 210 to provide additional clarifying information regarding the attribute of the Wall lights.

In the examples illustrated in FIG. 2, the home automation system discerns parameters according to the following sequential order: value, device, location, attribute. However, it is understood that the home automation system may discern the parameters according to different sequential orders. Such an order may depend on the completeness of an initial utterance (e.g., which parameters are present in the utterance, and which parameters are determined to be lacking in the initial utterance).

In addition, it is understood that control of one or more smart devices may require the home automation system to discern fewer than four of the noted parameters. For example, based on the environment 100 of FIG. 1, an utterance "Turn the television to channel 2" would not necessarily require that the home automation system discern the location of the television. This is because the home automation system recognizes that only one television device is located in the environment (i.e., in the living room 106). As such, the home automation system need not distinguish the television in the living room 106 from other television devices located in the environment 100.

As another example, an utterance "Turn on the television" may require the home automation system to discern even fewer of the noted parameters. For example, such an operational command relating to power may simply require that the device be discerned. If a given environment has two or more of such devices (e.g., in respective rooms), then an operational command relating to power may further require that the location of the device be discerned.

Another example utterance may be "Preheat the oven to cook cornbread." To comprehend such an utterance, the home automation system may identify deficiencies (or gaps) in its understanding and collect information from one or more smart devices and/or its knowledge base. For example, its knowledge base may include a cornbread recipe that specifies the temperature at which the oven is to be preheated. Therefore, based on information in its knowledge base, the home automation system is able to discern that cooking cornbread requires setting of the temperature (attribute) of the oven and, more particularly, setting of the temperature to the temperature specified in the recipe (value).

Figure 3A:
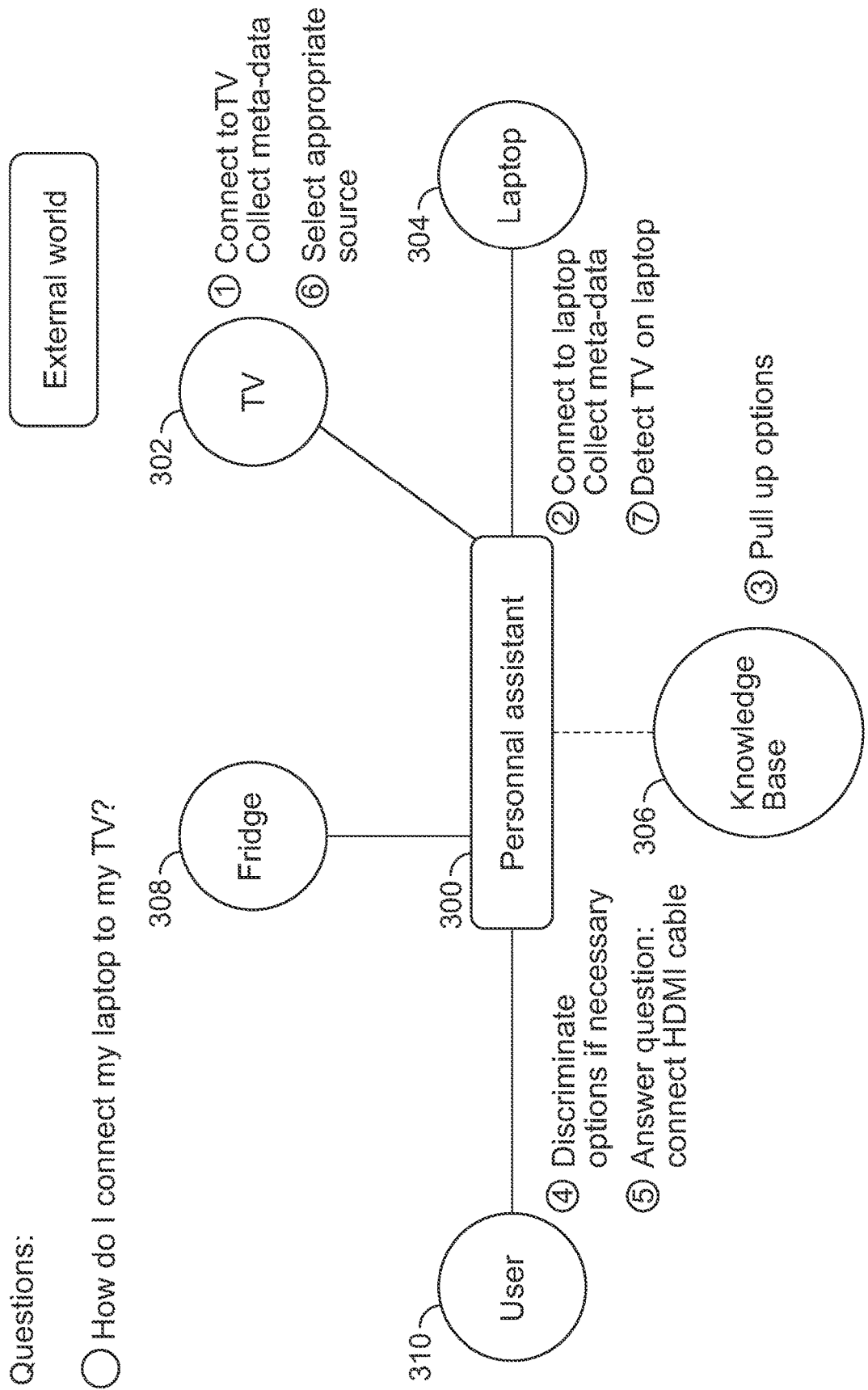
FIGS. 3A and 3B illustrate example responses to utterances (e.g., queries) spoken by a user, as provided by a home automation application according to at least one embodiment.
Figure 3B:
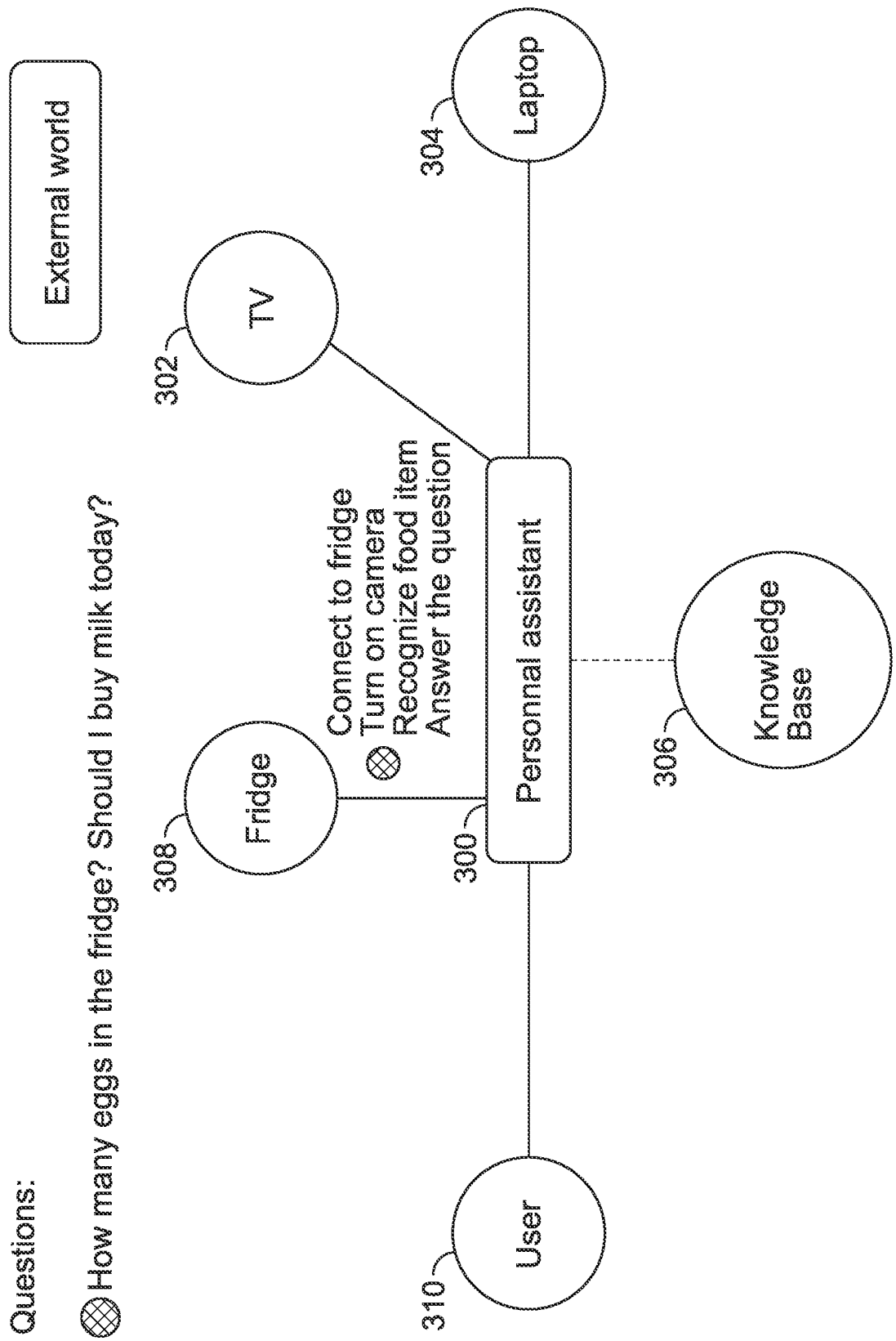

FIGS. 3A and 3B illustrate example responses to utterances (e.g., queries) spoken by a user 310, as provided by a home automation application (or system or apparatus) 300 according to at least one embodiment. The responses may be based on speech-to-text conversion of utterances that are captured by an audio sensor (e.g., microphone).

For example, with reference to FIG. 3A, the user 310 may speak the following utterance: "How do I connect my laptop to my TV?"

According to at least one embodiment, prior to prompting the user 310 to provide additional clarifying information, the home automation system 300 first attempts to gather information in order to fully comprehend the utterance and/or to provide a satisfactory response. Such information may be gathered from one or more smart devices within an environment and/or from one or more knowledge bases 306 (internal and/or external). As such, user friction is reduced.

In this regard, the home automation system 300 may perform orchestration, such that information is gathered from one or more smart devices and/or one or more databases (e.g., knowledge base 306).

For example, the home automation system 300 may recognize the term "television" as a device (e.g., television 302) that is located in an environment and that may be controlled. The home automation system 300 may communicate with the television 302 to collect metadata from the television. Such metadata may include information regarding a type and/or model of the television 302.

For example, the home automation system 300 may also recognize the term "laptop" as a device (e.g., laptop computer 304) that is located in the environment and that may be controlled. The home automation system 300 may communicate with the laptop computer 304 to collect metadata from the laptop computer. Such metadata may include information regarding a type and/or model of the laptop computer 304.

Based on the metadata collected from the television 302 and the laptop computer 304, the home automation system 300 may collect information stored in the knowledge base 306 that corresponds to (or is associated with) the type and/or model of the television 302 and information stored in the knowledge base 306 that corresponds to (or is associated with) the type and/or model of the laptop computer 304. Here, the home automation system 300 may collect information regarding possible external connections to the television 302. For example, the home automation 300 may collect information indicating that any of multiple types of connections (including, e.g., a High-Definition Multimedia Interface (HDMI) connection) to the television 302 is possible.

In view of multiple types of connections being possible, the home automation system 300 may prompt the user 310 to specify the type of connection that is intended.

The home automation system 300 may proceed based on the response provided by the user 310. For example, the user 310 may utter "I want to connect via HDMI cable." Based on this response, the home automation system 300 may discern that an HDMI connection is the intended type of connection. Accordingly, the home automation system 300 may control an external-connection source (attribute) of the television 302 to be set to HDMI (value). After the user 310 connects the television 302 and the laptop computer 304 via an HDMI cable, the laptop computer 304 is able to detect the television 302.

As another example, with reference to FIG. 3B, the user 310 may speak the following utterance: "How many eggs in the fridge? Should I buy milk today?"

Similar to the situation described earlier with respect to FIG. 3A, the home automation system 300 attempts to gather information in order to fully comprehend the utterance and/or to provide a satisfactory response. Such information may be gathered from one or more smart devices within an environment and/or from one or more knowledge bases 306 (internal and/or external). As such, user friction is reduced.

For example, the home automation system 300 may recognize the term "fridge" as a device (e.g., refrigerator 308) that is located in an environment and that may be controlled. The home automation system 300 may communicate with the refrigerator 308 to collect metadata from the refrigerator. Such metadata may include information regarding a type and/or model of the refrigerator 308. Such metadata may also include attributes of devices of the refrigerator 308 that are controllable. Such devices may include a camera that is controllable to be powered on/off.

Based on the metadata collected from the refrigerator 308, the home automation system 300 may recognize that the refrigerator has a camera that can be powered on. Accordingly, the home automation system 300 controls the refrigerator 308 to power on its camera. Alternatively, the home automation system 300 may first query the refrigerator 308 to provide the state of its camera. If the response by the refrigerator 308 indicates that the camera is turned off, then the home automation system 300 may control the refrigerator 308 to power on its camera.

After the camera of the refrigerator 308 is powered on, the home automation system 300 may request that the refrigerator 308 provide an image captured by the camera. Based on the image provided, the home automation system 300 determines whether eggs and milk are present in the refrigerator 308. For example, the home automation system 300 may use image recognition techniques to identify the potential presence of eggs and milk in the image provided by the refrigerator 308. In this regard, reference images of eggs and milk that are stored in the knowledge base 306 may be retrieved for purposes of comparison.

Based on the determinations made by the home automation system 300, the system provides one or more responses to the user 310.

Figure 4:
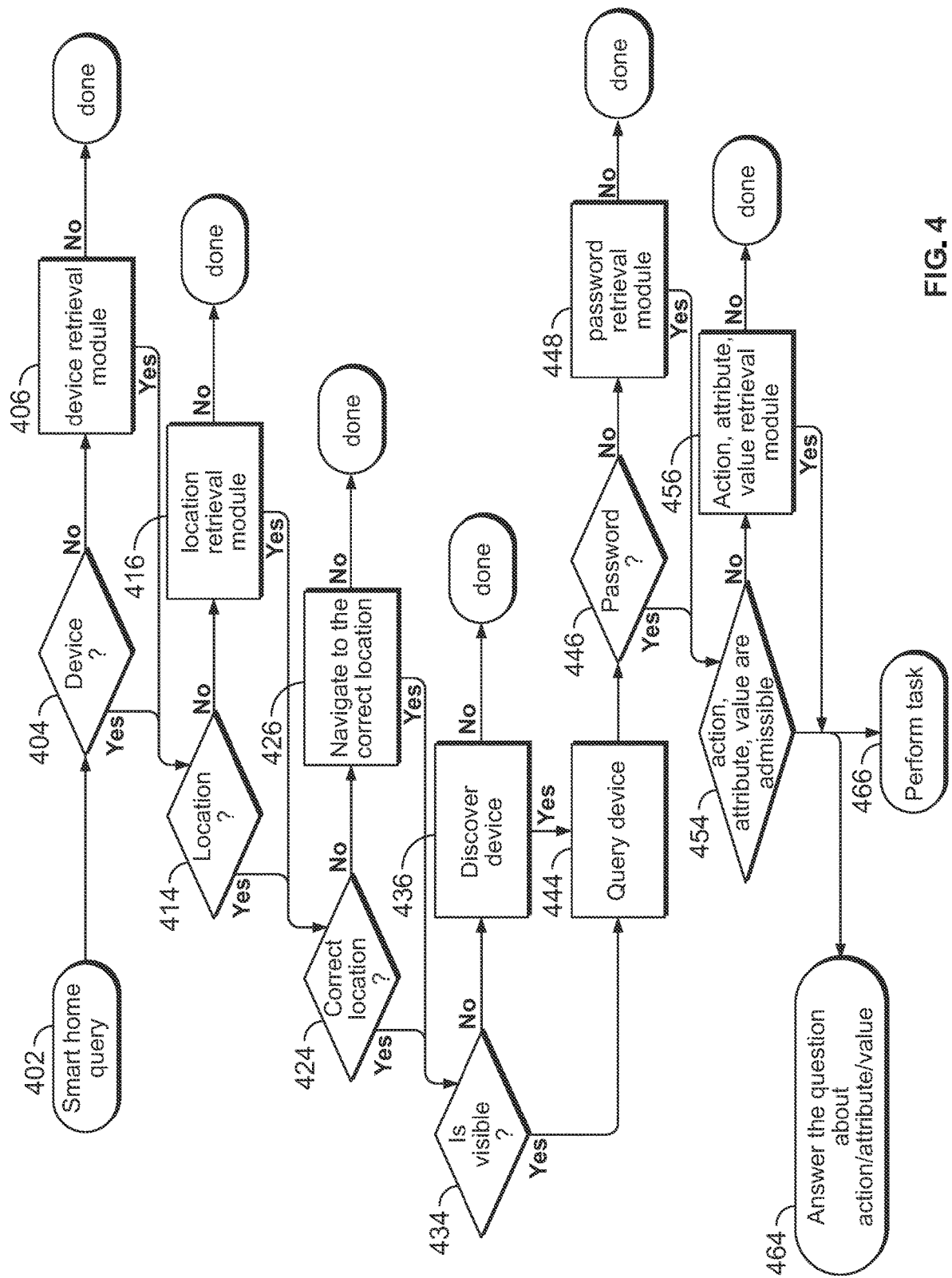
FIG. 4 illustrates a flowchart of a learning process performed by a home automation system according to at least one embodiment.

FIG. 4 illustrates a flowchart of a learning process performed by a home automation apparatus or system (e.g., home automation system 200, 300) according to at least one embodiment.

With reference to FIG. 4, the process may be initiated upon receiving an utterance 402 (e.g., a query) spoken by a user (e.g., a user 210, 310).

At block 404, the home automation system determines whether it understands the utterance 402 as containing details corresponding to a determinate device (e.g., a smart device located in a corresponding environment such as environment 100).

If the home automation system determines that it understands the utterance 402 as containing details corresponding to a determinate device, then the home automation system proceeds to block 414.

Otherwise, the home automation system (e.g., a device retrieval module 406 thereof) attempts to determine the specific device that the utterance 402 is addressing.

If the home automation system is able to determine the specific device, then the home automation system proceeds to block 414. Otherwise, the process is considered as being completed (done or finished).

At block 414, the home automation system determines whether it understands the utterance 402 as containing details corresponding to a determinate location (e.g., one of rooms 102, 104, 106, 108 of FIG. 1).

If the home automation system determines that it understands the utterance 402 as containing details corresponding to a determinate location, then the home automation system proceeds to block 424.

Otherwise, the home automation system (e.g., a location retrieval module 416 thereof) attempts to determine the specific location to which the utterance 402 pertains.

If the home automation system is able to determine the specific location, then the home automation system proceeds to block 424. Otherwise, the process is considered as being completed (done or finished).

At block 424, the home automation system determines whether the specific location is a correct location. For example, the home automation system may determine whether the specific location is consistent with its understanding regarding a layout of smart devices in the environment (e.g., environment 100).

If the home automation system determines that the specific location is a correct location, then the home automation system proceeds to block 434.

Otherwise, at block 426, the home automation system attempts to navigate to the correct location. For example, the home automation system may attempt to identify a different location that is consistent with its understanding regarding the layout of smart devices in the environment (e.g., environment 100). For example, the home automation system may attempt to identify a different location at which the device (e.g., the device identified at block 414 or at block 416) is located, based on its understanding.

If the home automation system is able to navigate to the correct location, then the home automation system proceeds to block 434. Otherwise, the process is considered as being completed (done or finished).

At block 434, the home automation system determines whether the device (e.g., the device identified at block 414 or 416) is visible. For example, the home automation system determines whether it has previously discovered the device (e.g., via a wireless protocol).

If the home automation system determines that it has already discovered the device, then the home automation system proceeds to block 444.

Otherwise, at block 436, the home automation system attempts to discover the device.

If the home automation system is able to discover the device, then the home automation system proceeds to block 444. Otherwise, the process is considered as being completed (done or finished).

At block 444, the home automation system queries the device. In this regard, at block 446, the home automation system determines whether it has a password for accessing the device.

If the home automation system has such a password, then the home automation system proceeds to block 454.

Otherwise, the home automation system (e.g., a password retrieval module 448 thereof) attempts to retrieve a password for the device.

If the home automation system successfully retrieves a password for the device, then the home automation system proceeds to block 454. Otherwise, the process is considered as being completed (done or finished).

At block 454, the home automation system determines whether the action/attribute/value are admissible. According to at least one embodiment, admissibility involves verifying whether the user has provided right information (e.g., information that is executable) for the action, value and/or attribute. For example, the user might want to play a movie using a certain software application, but in reality the corresponding device may not be able to access or run the software application.

If the action/attribute/value is admissible, then the home automation system proceeds to respond to an utterance regarding the action/attribute/value (see block 464) and/or to perform a requested task (see block 466).

Otherwise, the home automation system (e.g., an action/attribute/value retrieval module 456 thereof) attempts to retrieve an action/attribute/value.

If the home automation system successfully retrieves an action/attribute/value, then the home automation system proceeds to block 464 and/or block 466. Otherwise, the process is considered as being completed (done or finished).

According to at least one embodiment, information that is collected and/or discovered while performing the process of FIG. 4 is stored in a memory (e.g., at a memory storage device of the home automation system). For example, the information may be stored as part of its knowledge base (e.g., knowledge base 306).

Figure 5:
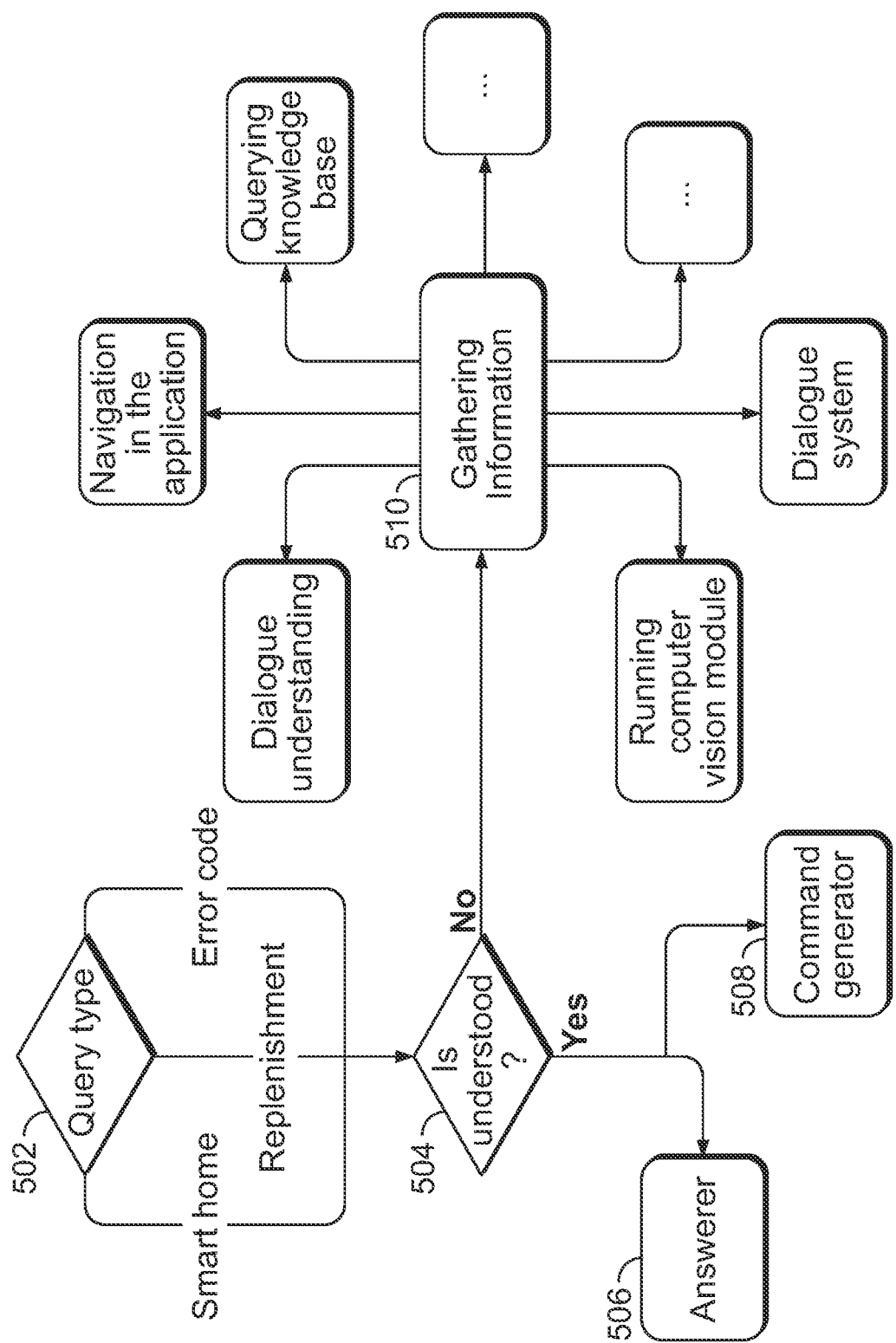
FIG. 5 illustrates processes that may be performed by an orchestrated system according to at least one embodiment.

FIG. 5 illustrates processes that may be performed by an orchestrated system according to at least one embodiment.

Regarding block 502, a query may correspond to one of various types, including a smart home type, a replenishment type, and an error code type. Examples of smart home-type queries have been described earlier, e.g., with reference to FIGS. 2, 3A and 3B. Replenishment-type queries may include queries regarding replenishment of items in a device (e.g., a smart refrigerator). Error code-queries may include queries regarding diagnosis based on an error code that is output by a device (e.g., a smart washing machine).

At block 504, it is determined whether the query is understood. If the query is understood, then an answerer 506 provides a suitable response to the query. If the query is understood as a request, then a command generator 508 controls execution of a task corresponding to the request.

With continued reference to block 504, if the query is not understood, then information is gathered (see block 510). For example, such information is gathered in order to understand the query, as well as to better address other potentially different queries that may arise in the future.

As illustrated in FIG. 5, gathering information may involve orchestration between various modules (e.g., dialogue understanding, knowledge base (see also knowledge base 306 of FIGS. 3A and 3B), computer vision, etc.). According to at least one embodiment, a home automation system learns to use one or more of such modules (e.g., in sequence, or in combination) to respond to utterances (e.g., requests, queries) made by a user. Also, reinforcement learning may be used to learn how to activate the suitable module(s) for collecting specific information.

In a smart home environment (e.g., environment 100 of FIG. 1A), smart appliances and devices may be considered as modules that are part of an ecosystem, each module having attributes that may be unique, as well as corresponding attribute values that may also be unique. Rather than manually develop rules to anticipate potential user interactions (e.g., requests and/or queries) involving such attributes and attribute values, a home automation system according to at least one embodiment explores the modules, including their respective attributes and attribute values, to develop an understanding of the modules in the ecosystem.

For example, according to at least one embodiment, a home automation system may explore the ecosystem to understand what devices (e.g., smart devices) are in that ecosystem. Once such an understanding is developed, the home automation system may learn how to gather information within the ecosystem (and potentially from external knowledge) in order to better handle user requests and/or queries as they arise.

As explained earlier with reference to various embodiments, the system may operate to reduce a level of user friction. For example, the system may gather information (see, e.g., block 510) rather than prompt the user to provide clarifying information. According to at least one embodiment, the system requests the user to provide such clarifying information after attempts to gather the information (see, e.g., block 510) prove unsuccessful. This may occur, for example, when handling more complex requests and/or queries.

Accordingly, aspects of this disclosure are directed toward increasing scalability of a home automation system. When a new smart device is introduced into an ecosystem, a user need not manually develop (or establish) rules in an a priori manner for the purpose of governing interactions with the new device. These rules would then be used to discern the intent of an utterance spoken in a given interaction. According to one or more aspects, such a new smart device may be explored by a home automation system upon introduction of the device into the ecosystem. As such, the knowledge of the home automation system may grow dynamically over time. Also, new devices can be integrated more seamlessly, without requiring that extra training be performed.

Figure 6:
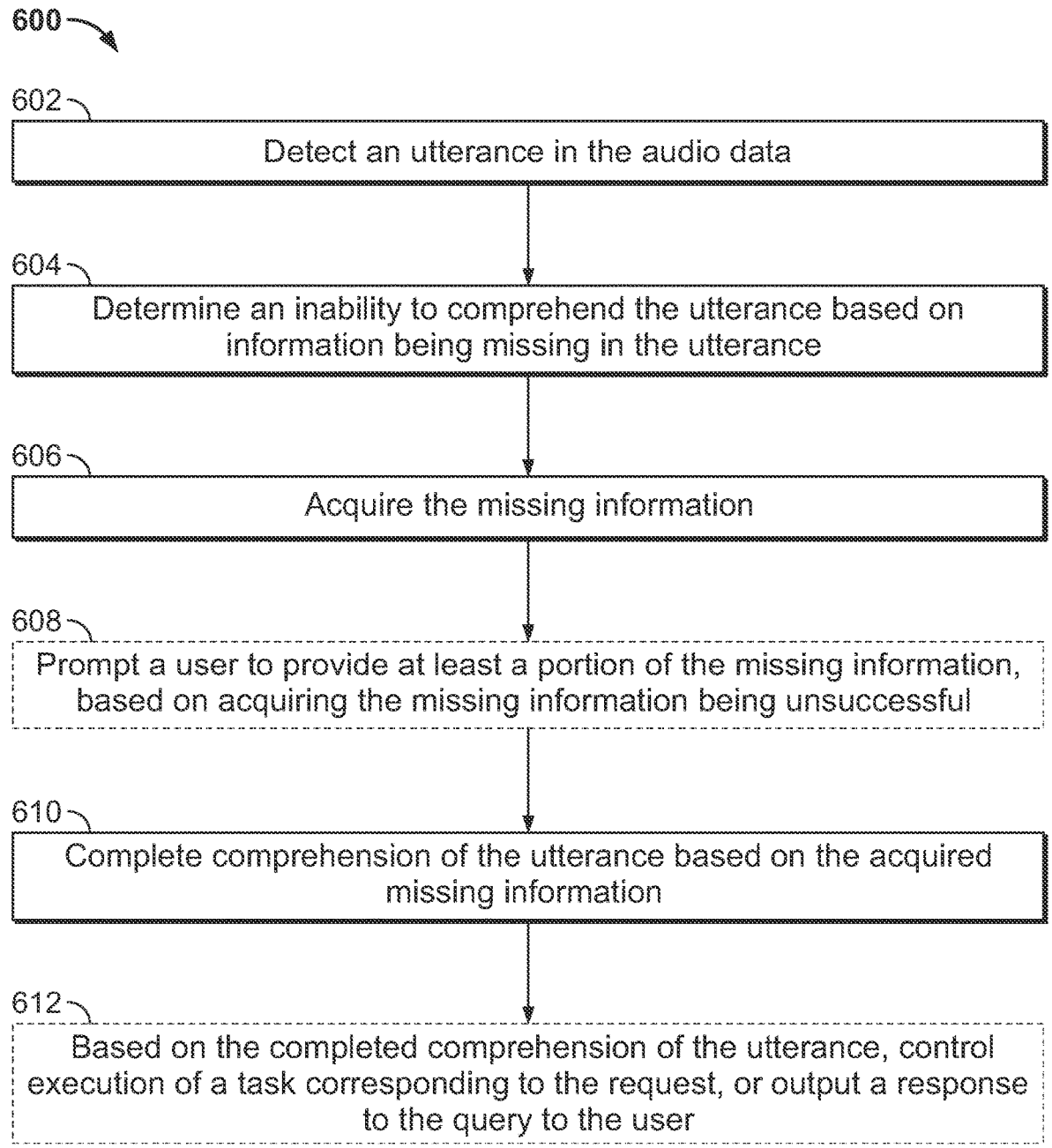
FIG. 6 illustrates a flowchart of a method performed by a home automation system according to at least one embodiment.

FIG. 6 illustrates a flowchart of a method 600 performed by a home automation system (e.g., home automation system 200, 300) according to at least one embodiment. Although blocks listed in FIG. 6 are listed according to a certain order, it is understood that the ordering is optional, and that one or more blocks may be omitted.

At block 602, the home automation system detects an utterance in audio data captured by an audio sensor.

The utterance may include a request or a query spoken by a user regarding at least one target smart device of a plurality of smart devices.

The plurality of smart devices located in the environment may include at least one smart home appliance (see, e.g., environment 100 of FIG. 1).

For example, with reference to FIG. 2, the utterance "Turn on the lights to blue" is detected.

At block 604, the home automation system determines an inability to comprehend the utterance based on information being missing in the utterance.

The missing information may relate to at least one parameter of a structured representation of the utterance. The at least one parameter of the structured representation may correspond to an identity of the at least one target smart device, a location of the at least one target smart device in the environment, an attribute of the at least one target smart device, or a value of the attribute.

For example, with reference to FIG. 2, the home automation system is unable to comprehend the utterance "Turn on the lights to blue" because the utterance does not specify the attribute that is to be controlled.

At block 606, the home automation system acquires the missing information. The missing information may be acquired by at least: acquiring the missing information from at least one smart device of a plurality of smart devices located in the environment; or acquiring the missing information from a knowledge base of the artificial intelligence system.

For example, the missing information may be acquired by: querying the at least one smart device; and receiving a reply from the at least one smart device. The reply from the at least one smart device may include metadata of the at least one smart device.

For example, with reference to FIG. 2, the home automation system may query the Wall lights in the kitchen 108, and receive a reply from the Wall lights. The reply from the Wall lights may include metadata indicating that a color attribute may be set to the value blue.

At block 608, the home automation system may prompt the user to provide at least a portion of the missing information, based on acquiring the missing information being unsuccessful.

For example, with reference to FIG. 2, the home automation system may prompt the user 210 to provide a more complete name of the device and/or the location of the device that is to be controlled. This prompting may occur based on attempts by the home automation system to discern the identity of the device and/or the location of the device proving unsuccessful. Such attempts may have involved: acquiring the missing information from at least one smart device of a plurality of smart devices located in the environment; and/or acquiring the missing information from a knowledge base of the artificial intelligence system.

In this regard, the user 210 may utter "Wall lights" or "Wall lights in the kitchen."

At block 610, the home automation system completes comprehension of the utterance based on the acquired missing information.

For example, the home automation system completes the comprehension of the utterance by using the acquired missing information to complete the structured representation of the utterance.

For example, with reference to FIG. 2, the home automation system completes the comprehension of the utterance "Turn on the lights to blue" by using acquired missing information (e.g., the location of the Wall lights (i.e., kitchen 108) as retrieved by the home automation system from its knowledge base, information communicated by the Wall lights indicating that a color attribute may be set to the value blue).

At block 612, based on the completed comprehension of the utterance, the home automation system may control execution of a task corresponding to the request, or output a response to the query to the user.

For example, with reference to FIG. 2, the home automation system may cause the wall lights in the kitchen 108 (see, e.g., FIG. 1) to be set to blue.

Figure 7:
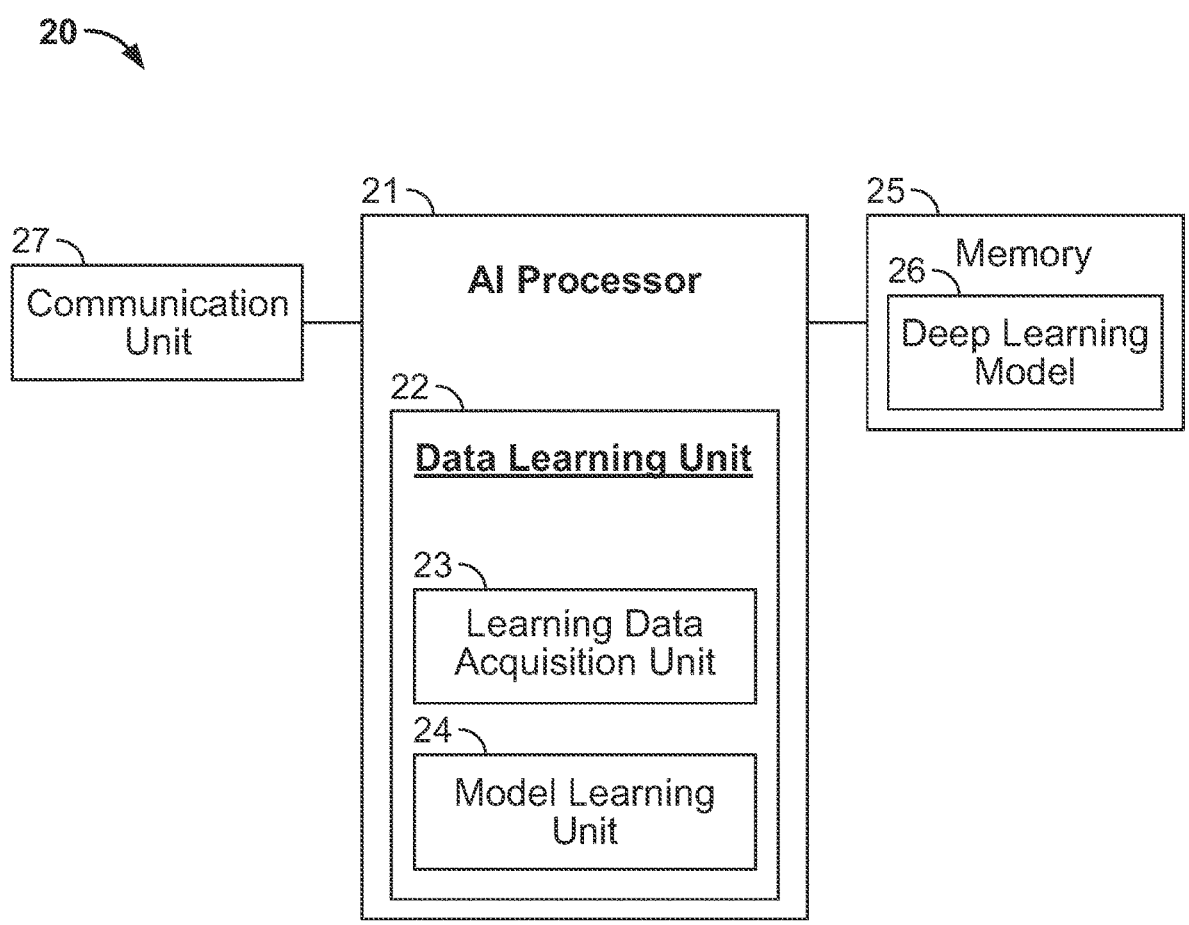
FIG. 7 is a block diagram of an artificial intelligence (AI) device according to at least one embodiment.

FIG. 7 is a block diagram of an AI device (or apparatus) according to at least one embodiment.

An AI device 20 may include an electronic device including an AI module that can perform AI processing, a server including the AI module, or the like. Further, the AI device 20 may be included as at least one component of a home Internet of Things (IoT) device (e.g., see smart devices located in the rooms 102, 104, 106, 108) to perform together at least a portion of the AI processing.

The AI processing may include operations related to control of the home automation system 200 of FIG. 2 and/or the home automation system 300 of FIG. 3. For example, the home automation system 200 can perform processing/determining, and control signal generating operations by performing AI processing on sensing data transmitted from the smart devices located in the rooms 102, 104, 106, 108, or acquired data. Further, for example, the home automation system 200 can control such devices by performing AI processing on data received through a communication unit (e.g., communication unit (or transceiver) 27).

The AI device 20 may include an AI processor 21, a memory 25, and/or a communication unit 27.

The AI device 20, which is a computing device that can learn a neural network, may be implemented as various electronic devices such as a server, a desktop personal computer (PC), a notebook PC, and a tablet PC.

The AI processor 21 can learn a neural network using programs stored in the memory 25. In particular, the AI processor 21 can learn a neural network for recognizing data related to smart devices. Here, the neural network for recognizing data related to smart devices may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a central processing unit (CPU)), or may be an AI-only processor (e.g., a graphics processing unit (GPU)) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data learning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquisition unit 23 and a model learning unit 24.

The learning data acquisition unit 23 can acquire learning data required for a neural network model for classifying and recognizing data. For example, the learning data acquisition unit 23 can acquire, as learning data, data about a home IoT server and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning unit 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory (e.g., memory 25). The model learning unit 24 may store the learned neural network model in the memory of a server connected with the AI device 20 through a wired or wireless network.

The data learning unit 22 may further include a learning data preprocessor and a learning data selector to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquisition unit 23 or the learning data preprocessed by the preprocessor. The selected learning data can be provided to the model learning unit 24. For example, the learning data selector can select only data for objects included in a specific area as learning data by detecting the specific area in an image acquired through a camera of a particular smart device.

Further, the data learning unit 22 may further include a model estimator to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Examples of the external electronic device may include a home IoT device, a robot, a drone, an augmented reality (AR) device, a mobile device, a home appliance, and the like.

For example, when the external electronic device is a home IoT device, the AI device 20 may be defined as a home IoT device that communicates with the home IoT server, or another home IoT device or a 5G network. Meanwhile, the AI device 20 may be implemented by being functionally embedded in a processor included in a home IoT server. Further, the 5G network may include a server or a module that performs AI processing.

Meanwhile, the AI device 20 of FIG. 7 was functionally separately described with reference to the AI processor 21, the memory 25, the communication unit 27, etc., but it is understood that the aforementioned components may be integrated in one module and referred to as an AI module.

Figure 8:
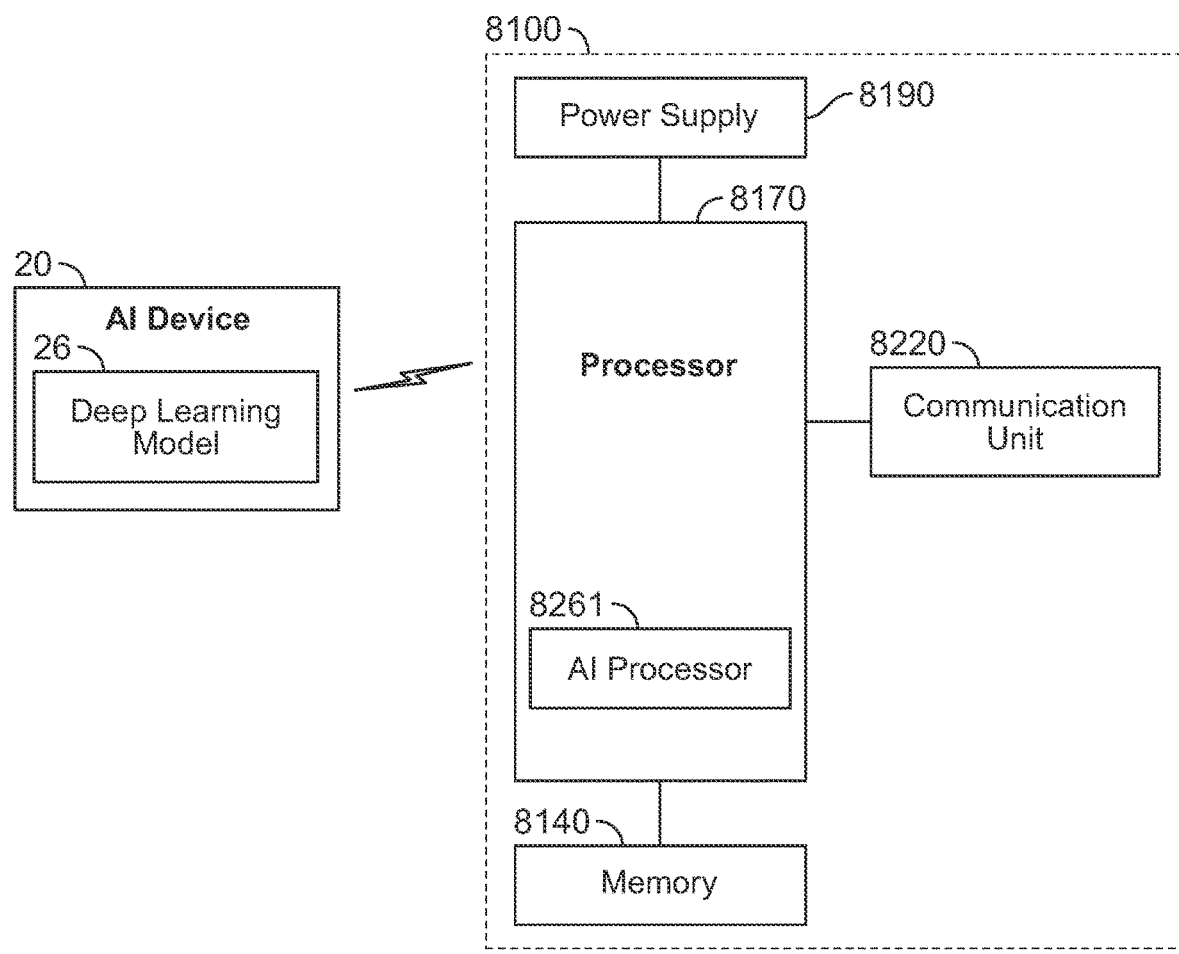
FIG. 8 is a diagram illustrating a system in which a server (e.g., a home Internet of Things (IoT) server) and an AI device are linked according to at least one embodiment.

FIG. 8 is a diagram illustrating a system in which a home IoT server and an AI device are linked according to at least one embodiment.

Referring to FIG. 8, a home IoT server 8100 can transmit data that require AI processing to an AI device 20 (e.g., the AI device 20 of FIG. 6) through a communication unit (or transceiver), and the AI device 20 including a neural network model 26 can transmit an AI processing result using the neural network model 26 to the home IoT server 8100.

The home IoT server 8100 may include a memory 8140, a processor 8170, and a power supply 8190, and the processor 8170 may further include an AI processor 8261. The processor 8170 may be referred to as a main controller.

The home IoT server 8100 may include an interface. The interface can be configured using at least one of a communication module, a terminal, a pin, a cable, a port, a circuit, an element or a device.

The memory 8140 is electrically connected with the processor 8170. The memory 8140 can store basic data about home IoT devices, control data for operation control of home IoT devices, and input/output data. The memory 8140 can store data processed in the processor 8170. With regards to hardware configuration, the memory 8140 may be configured using at least one of a ROM, a RAM, an EPROM, a flash drive, or a hard drive. The memory 8140 can store various types of data for the overall operation of the home IoT server 8100, such as a program for processing or control of the processor 8170. The memory 8140 may be integrated with the processor 8170. In one or more particular embodiments, the memory 8140 may be classified as a lower configuration of the processor 8170.

Further, the memory 8140 can store an internal image, a surrounding image, a safety signal, or a warning signal.

The power supply 8190 can supply power to the home IoT server 8100. The power supply 8190 can be provided with power from a power source (e.g., a battery) included in the home IoT server 8100 and can supply the power to each module of the home IoT server 8100.

The processor 8170 can be electrically connected to the memory 8140, the interface, and the power supply 8190 and exchange signals with these components. The processor 8170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 8170 can be operated by power supplied from the power supply 8190. The processor 8170 can receive data, process the data, generate a signal, and provide the signal while power is supplied thereto by the power supply 8190.

The processor 8170 can receive information from home IoT devices connected with the home IoT server 8100. The processor 8170 can provide control signals to home IoT devices connected with the home IoT server through the interface.

The processor 8170 can set some space and a surrounding space as a dangerous space on the basis of an internal image transmitted through the communication unit (or transceiver) 8220 and can acquire approach information related to a situation in which a person included in a predetermined range approaches the set dangerous space. The processor can apply the approach information to a danger-possible situation determination classification model learned in advance, determine whether the situation in which the approach information has been recognized is a dangerous situation on the basis of the applying result, and generate a safety signal or a warning signal on the basis of the determining result.

The home IoT server 8100 may include at least one printed circuit board (PCB). The memory 8140, the interface, the power supply 8190, and the processor 8170 may be electrically connected to the PCB.

Hereafter, a home IoT device and an AI processor 8261 that are connected with the home IoT server 8100 are described in more detail with respect to one or more embodiments.

Meanwhile, the home IoT server 8100 transmits the approach information to the AI device 20 through the communication unit 8220 and the AI device 20 can transmit AI processing data generated by applying the neural network model 26 to the transmitted data to home IoT server 8100. The home IoT server 8100 can recognize the probability that the current situation is a danger-possible situation requiring to control the home IoT device and reflect a warning signal characteristic on the basis of the received AI-processed data, can control the operation of the home IoT device on the basis of the probability of a danger, and can reflect a corresponding warning signal.

The communication unit 8220 can exchange signals with a home IoT device positioned in a space in a home or a smartphone or a smart device positioned in a space outside the home. The communication unit 8220 can exchange signals with at least any one of an infrastructure (e.g., a server and a broadcast station), a home IoT device, a smartphone, and a smart device. The communication device 8220 may include a transmission antenna, a reception antenna, and at least one of a radio frequency (RF) circuit and an RF element which can implement various communication protocols in order to perform communication.

The communication unit 8220 can receive internal images or surrounding images from a plurality of cameras, can transmit a control signal or a safety signal to a plurality of home IoT devices, and can transmit a warning signal to a registered user. The communication unit 8220 can transmit a safety signal to some home IoT devices to control the operations of the some home IoT devices or can transmit a warning signal to a registered user under control by the processor 8170.

Meanwhile, the AI processor 8261 can recognize the probability that the current situation is a danger-possible situation requiring to control the home IoT device and reflect a warning signal characteristic, using approach information transmitted from each home IoT device, can control the operation of the home IoT device on the basis of the probability of a danger, and can generate a corresponding warning signal.

According to at least one embodiment, the communication unit 8220 can acquire approach information. The communication unit 8220 can transmit the acquired approach information to the processor 8170.

According to at least one embodiment, the processor 8170 can calculate the probability that the current situation is a danger-possible situation, using the approach information transmitted from the communication unit 8220. The processor 8170 can determine whether to transmit a safety signal to a home IoT device or a warning signal to a registered user on the basis of the probability that the current situation is a danger-possible situation.

In the disclosure, communication (e.g., 5G communication) for implementing a home automation system according to at least one embodiment and configuration for performing AI processing and for transmitting the AI processing result by applying the communication were described.

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the invention should be determined by the appended claims and their legal equivalents, and not by the above description, and all changes coming within the meaning and equivalency range of the appended claims are intended to be embraced therein.

What is claimed is:

1. An artificial intelligence apparatus for reducing user friction in a home automation system utilizing a neural network model trained through reinforcement learning, the artificial intelligence apparatus comprising:

at least one audio sensor configured to capture audio data; and at least one processor configured to:
detect an utterance in the audio data;
determine an inability to complete a structured representation of the utterance based on information being missing in the utterance;
in lieu of prompting a user to provide at least a portion of the missing information, acquire the missing information by at least:
acquiring the missing information from at least one smart device of a plurality of smart devices in the home automation system,
wherein the at least one processor is further configured to acquire the missing information by:
querying the at least one smart device; and
receiving a reply from the at least one smart device,
wherein the user friction is reduced by acquiring the missing information without first prompting the user to provide at least the portion of the missing information; and
complete the structured representation of the utterance based on the acquired missing information.

2. The artificial intelligence apparatus of claim 1, wherein the utterance comprises a request or a query spoken by the user regarding at least one target smart device of the plurality of smart devices.

3. The artificial intelligence apparatus of claim 2, wherein the missing information relates to at least one parameter of the structured representation of the utterance.

4. The artificial intelligence apparatus of claim 3, wherein the at least one parameter of the structured representation corresponds to an identity of the at least one target smart device, a location of the at least one target smart device in the home automation system, an attribute of the at least one target smart device, or a value of the attribute.

5. The artificial intelligence apparatus of claim 2, wherein the at least one processor is further configured to:
based on the completed structured representation of the utterance, control execution of a task corresponding to the request, or output a response to the query to the user.

6. The artificial intelligence apparatus of claim 1, wherein the reply from the at least one smart device comprises metadata of the at least one smart device.

7. The artificial intelligence apparatus of claim 1, wherein the plurality of smart devices located in the home automation system comprises at least one smart home appliance.

8. The artificial intelligence apparatus of claim 1, wherein the at least one processor is further configured to:
prompt the user to provide at least the portion of the missing information, based on acquiring the missing information being unsuccessful.

9. A method of operating an artificial intelligence apparatus for reducing user friction in a home automation system utilizing a neural network model trained through reinforcement learning, the method comprising:
detecting, by at least one processor, an utterance in audio data captured by at least one audio sensor;
determining, by the at least one processor, an inability to complete a structured representation of the utterance based on information being missing in the utterance;
in lieu of prompting a user to provide at least a portion of the missing information, acquiring, by the at least one processor, the missing information by at least:
acquiring the missing information from at least one smart device of a plurality of smart devices in the home automation system,
wherein acquiring the missing information comprises:
querying the at least one smart device; and
receiving a reply from the at least one smart device,
wherein the user friction is reduced by acquiring the missing information without first prompting the user to provide at least the portion of the missing information; and
completing, by the at least one processor, the structured representation of the utterance based on the acquired missing information.

10. The method of claim 9, wherein the utterance comprises a request or a query spoken by the user regarding at least one target smart device of the plurality of smart devices.

11. The method of claim 10, wherein the missing information relates to at least one parameter of the structured representation of the utterance.

12. The method of claim 11, wherein the at least one parameter of the structured representation corresponds to an identity of the at least one target smart device, a location of the at least one target smart device in the home automation system, an attribute of the at least one target smart device, or a value of the attribute.

13. The method of claim 10, further comprising
based on the completed structured representation of the utterance, controlling, by the at least one processor, execution of a task corresponding to the request, or outputting a response to the query to the user.

14. The method of claim 9, wherein the reply from the at least one smart device comprises metadata of the at least one smart device.

15. The method of claim 9, further comprising:
prompting, by the at least one processor, the user to provide at least the portion of the missing information, based on acquiring the missing information being unsuccessful.

16. A non-transitory computer-readable medium storing instructions for reducing user friction in a home automation system utilizing a neural network model trained through reinforcement learning that, when executed by one or more processors, cause the one or more processors to:
detect an utterance in audio data captured by at least one audio sensor;
determine an inability to complete a structured representation of the utterance based on information being missing in the utterance;
in lieu of prompting a user to provide at least a portion of the missing information, acquire the missing information by at least:
acquiring the missing information from at least one smart device of a plurality of smart devices in the home automation system,
wherein acquiring the missing information comprises:
querying the at least one smart device; and
receiving a reply from the at least one smart device,
wherein the user friction is reduced by acquiring the missing information without first prompting the user to provide at least the portion of the missing information; and
complete the structured representation of the utterance based on the acquired missing information.

* * * * *